(12) United States Patent
Hobbs et al.

(10) Patent No.: US 7,401,378 B2
(45) Date of Patent: Jul. 22, 2008

(54) VACUUM ATTACHMENT FOR A YARD VACUUM APPARATUS

(76) Inventors: Jerry Dean Hobbs, P.O. Box 507, Puxico, MO (US) 63960; Loran Caldwell, 18452 County Rd., 420 A, Puxico, MO (US) 63960

( * ) Notice: Subject to any disclaimer, the term of this patent is extended or adjusted under 35 U.S.C. 154(b) by 95 days.

(21) Appl. No.: 11/406,560

(22) Filed: Apr. 19, 2006

(65) Prior Publication Data
US 2007/0245513 A1    Oct. 25, 2007

(51) Int. Cl.
*A47L 5/00* (2006.01)
(52) U.S. Cl. .................. 15/246.2; 15/422.1
(58) Field of Classification Search ........... 15/246.2, 15/398, 415.1, 522.1, 422.1
See application file for complete search history.

(56) References Cited

U.S. PATENT DOCUMENTS

| | | | |
|---|---|---|---|
| 1,941,758 A * | 1/1934 | Riebel, Jr. .................... 15/325 |
| 2,071,077 A * | 2/1937 | Leathers .................... 15/415.1 |
| 2,867,836 A * | 1/1959 | Duff .......................... 15/404 |
| 4,244,080 A * | 1/1981 | Wessel ....................... 15/325 |
| 4,570,286 A | 2/1986 | Ross |
| D306,506 S | 3/1990 | Houser |
| 5,440,781 A | 8/1995 | Kitazawa et al. |
| 5,652,995 A | 8/1997 | Henke et al. |
| 6,280,532 B1 | 8/2001 | Allen |
| 6,588,058 B2 * | 7/2003 | Vanderlinden ............... 15/416 |
| 6,766,560 B2 | 7/2004 | Murphy |
| 6,979,373 B1 * | 12/2005 | Rogers ........................ 134/21 |

* cited by examiner

*Primary Examiner*—Dung Van Nguyen
(74) *Attorney, Agent, or Firm*—Raymond M. Galasso; Galasso & Associates, L.P.

(57) ABSTRACT

An outdoor yard vacuum apparatus is provided with a removable vacuum attachment. The vacuum attachment adapts the yard vacuum for cleaning and debris removal of a variety of both indoor and outdoor surfaces in a variety of environments beyond the original capabilities of the yard vacuum. The vacuum attachment having a forward facing debris pickup slot of adjustable length, a stiff bristle brush affixed to the bottom surface of the vacuum head, and a set of head carrier wheels axially affixed to the opposing end caps of the vacuum head. The vacuum attachment suited to debris removal from non-carpeted areas, particularly examples such as athletic stadiums and bleachers, convention halls and various other facilities and environments.

6 Claims, 4 Drawing Sheets

VACUUM ATTACHMENT FOR A YARD VACUUM APPARATUS

FIELD OF THE DISCLOSURE

The disclosures made herein relate generally to outdoor yard vacuum and leaf blower apparatuses, and particularly to vacuum attachments for such yard vacuum apparatuses which are removably joinable to the lawn vacuum and by their design adapt the yard vacuum to clean a variety of both indoor-and outdoor surfaces in a variety of environments beyond the-original capabilities of the yard vacuum.

BACKGROUND

Portable or transportable yard or lawn vacuums and leaf blowers driven by small electric or gasoline powered engines are well known. Such yard or lawn vacuums are used by home owners and commercial building grounds maintenance crews to clean and remove various debris from lawns, under treed areas and on driveways, for example. Such portable yard vacuums utilize a small engine or motor to spin a high speed centrifugal fan blower to generate a vacuum, using the motive force of airflow to pick up debris. The operation of the impellers of the fan generate a suction on the inlet side of the blower and a positive pressure on the outlet side, wherein the amount of pressure differential generated is generally inversely related to the volume of air flow through the fan, other factors such as fan speed, impeller geometry, air density, etc. being held constant. Lawn vacuums are commonly configured with the motor or engine mounted inline with the fan shaft and directly to the back of the fan housing, provided with a handle of some variety mounted on the fan or motor housing to allow the entire unit to be carried, and manipulated over a surface to be cleaned during use.

Lawn vacuums and blowers are commonly sold configured and equipped for cleanup of outdoor lawn, sidewalk and driveway debris, particularly leaves and lawn clippings. When used as a lawn vacuum, the apparatus is equipped with a bag attached to the fan outlet port to capture and retain leaves and debris in the bag for later disposal. An elongated tube or other debris pick up and transport means is connected to the fan suction port. When used as a yard blower apparatus, an elongated tube is reconfigured to connect to the fan outlet port so that the air flow through the fan is used to blow debris off the driveway by directing and impinging the fan air flow onto debris, thereby displacing the debris. Since outdoor debris such as leaves and clippings can be relatively large in size, the elongated pick up tube is normally of a relatively large diameter, at least relative to the diameter of normal household vacuums. This larger diameter accommodates the pick up of larger size debris encountered in the outdoor environment.

A limitation of yard or lawn vacuums is that the attachments provided are configured for outdoor lawn debris pick up but are not well suited for other debris pick up in other outdoor environments or indoor environments such as bleachers in stadiums, theaters, convention halls, zoos, etc.

Another limitation of the attachments provided with yard or lawn vacuums is that the vacuum attachment generally consists of little more that a tube having an open debris end. This tube can be used to pick up debris on other environments, but the limited size of the tube and therefore the width of the swath cleaned in each pass of the nozzle requires more passes of the nozzle over the surface to be cleaned. The limited swath width and additional cleaning passes results in the waste of time and movement and makes the cleanup process an inefficient one.

Therefore, a vacuum attachment which provides a debris pick up opening having a wide debris pick up, a vacuum attachment that can be removably mounted to and later removed from the vacuum pick up tube of a variety of standard yard vacuums, a vacuum attachment which enhances the functionality of the yard vacuum by adapting the yard vacuum to debris cleanup in a variety of additional environments such as but not limited to bleachers, theaters, athletic stadiums, schools, convention halls, amusement parks, sawdust and debris in building construction, and factories, an attachment that is adjustable in width as to conform to the spacing between, for example, seat rows in a stadium bleacher of theater, such a vacuum attachment for a yard vacuum apparatus would be useful and novel.

SUMMARY OF THE DISCLOSURE

Accordingly, embodiments of the inventive disclosures made herein comprise a removable vacuum attachment for installing to the suction port of vacuum pick up tube of a portable outdoor yard vacuum apparatus.

In a first embodiment of the inventive disclosures herein relate generally to a vacuum attachment for a portable outdoor yard vacuum apparatus, the attachment comprising an elongated vacuum debris pick up head having a debris cavity disposed within and an elongated debris pick up slot on a bottom side of the head for receiving debris into the head. In use the elongated bottom slot faces substantially forward rather than in a floor facing position as would be the case in a conventional vacuum cleaner attachment. With the forward facing arrangement, the vacuum attachment is suit to the pickup of debris such as candy and food wrappers and bags from a stadium, while the head pushes beverage and pop cans and bottles to the edge of the bleacher. The embodiment includes a debris transport conduit means of joining the vacuum head of the present inventive disclosure to the vacuum conduit or blower suction port of the outdoor vacuum. This conduit provides closed transport of debris from the nozzle cavity to a vacuum conduit and ultimately to the fan suction of the yard vacuum and transmits the vacuum developed at the blower to the vacuum head of the subject vacuum attachment. The debris pickup slot of the vacuum attachment faces substantially forward in alignment with the axis of the debris conduit means, as discussed earlier above. This conduit means by design is user installable to the yard vacuum apparatus for use is cleaning and may later be removed after the cleanup job is completed. As discussed earlier, the vacuum attachment adapts the yard vacuum for cleanup uses beyond the original cleaning capabilities of the yard vacuum and enhances the functionality of the yard vacuum by enabling efficient debris cleanup in a variety of additional environments such as but not limited to bleachers, theaters, athletic stadiums, baseball fields, football fields, school buildings, churches, convention halls, amusement park facilities, sawdust and debris in building construction, and factories, among other uses.

In a second embodiment of the removable vacuum attachment for a portable outdoor yard vacuum apparatus the vacuum head is an extended tubular vacuum head having two opposing ends and a forward facing slot for receiving debris such as wrappers and chip bags, the slot disposed along a length of the vacuum head, the slot opening generally aligned with the axis of the conduit means. Two end caps are secured to and closing the opposing ends of the tubular vacuum head.

The vacuum attachment conduit means is an extended tubular conduit having a lower end joined to and having pressure and fluid communication with the debris cavity of the vacuum head. The upper end of the tubular conduit is sized and adapted to be removably joinable to the vacuum conduit of the yard vacuum.

In a third embodiment of the removable vacuum attachment for a portable outdoor yard vacuum, the first embodiment is modified to have a vacuum head in the form of an elongated 'U' shape. The elongated 'U' shaped head has two closed opposing ends. The opening edge between the sides of the 'U' provides and forms the bottom elongated debris slot for receiving debris into the debris cavity while the interior of the 'U' shape forms the debris cavity.

In a fourth embodiment of the removable vacuum attachment, the third embodiment is modified such that the conduit means is an extended tubular conduit or pipe section having an upper end and a lower end. The lower end of the tubular conduit is secured to the tubular vacuum head while the upper head sized and adapted for removably joining to the vacuum conduit of the yard vacuum apparatus, the conduit having closed fluid and pressure communication between the debris cavity and the blower suction intake of the yard vacuum apparatus.

In a fifth embodiment of the removable vacuum attachment, the third embodiment is modified such that the conduit means is a flexible hose having an upper end and a lower end, the lower end secured to the tubular vacuum head, the upper head sized and adapted for removably joining the vacuum conduit of the yard vacuum apparatus, the conduit having closed fluid communication between the cavity and the yard vacuum apparatus.

In a sixth embodiment of the removable vacuum attachment, the vacuum attachment for a portable outdoor yard vacuum apparatus comprises an extended tubular vacuum head having an elongated debris cavity within and a forward facing debris receiving slot communicating between an exterior surface of the head and the debris cavity. The debris receiving slot is disposed along a length of the vacuum head, the debris receiving slot in a substantially axial alignment with the axis of elongation of the debris conduit. The debris slot is for receiving debris such as chip bags and candy wrappers into the vacuum head cavity while vacuuming. The tubular vacuum head has a length between 12 to 24 inches and has a diameter between 3 to 6 inches. There are two end caps, each one secured to and closing opposing ends of the vacuum head. A rigid tubular debris conduit is provided for removably joining the vacuum head to the outdoor vacuum apparatus. The conduit provides closed transport of debris from the head cavity to the vacuum conduit of the yard vacuum. The upper end of the tubular conduit is sized and adapted to removably join to a debris vacuum conduit of the yard vacuum. The lower end of the vacuum attachment debris conduit is secured to vacuum head and is in closed fluid and pressure communication with the cavity of the head.

In a seventh embodiment of the removable vacuum attachment, the sixth embodiment is modified such that the rigid tubular conduit has a length between 8 to 24 inches and the conduit has a diameter between 3 to 6 inches. The conduit diameter is chosen to removably join with and sealably close on the diameter of the debris vacuum or suction conduit of the yard vacuum apparatus. The vacuum head comprising an inner tubular vacuum head and an outer tubular vacuum head, wherein the inner head is retentively and telescopically received within the outer tubular vacuum head and the inner head is telescopically adjustable relative to the outer tubular head so that width of the vacuum head and debris slot are adjustable. A threaded bolt is secured into a pocket in and extending from an inside surface of the inner vacuum head through an elongated vacuum head length adjustment slot in the outer vacuum head, the slot sized to permit the inner head and the bolt to slide in the vacuum head length adjustment slot of the outer head, thereby adjusting the inner and outer head position between collapsing the inner head into the outer head at one limit to extending beyond the outer head by 0 to 4 inches at opposite limit of travel. A threaded wing nut threadably received onto the bolt on the outside surface of the outer vacuum head, the wing nut and bolt, when tightened, Patent Application compressing the sidewalls of the inner and outer head so as to fix the telescopic position of the inner and outer tubular vacuum heads. Two vacuum head carrier wheels are provided, each wheel positioned beside an opposing end cap of the vacuum head and axially mounted to the end cap such that the wheel is free to rotate and such that the wheel supports the vacuum head above the floor to be cleaned. A ¼ inch stiff bristle brush is secured to the bottom surface of the outer vacuum head such that the brush bristles align to brush the surface being cleaned, wherein the wheels are sized to support the vacuum head at a distance of ⅜ inch above the surface to be cleaned.

In an eighth embodiment of the removable vacuum attachment, the seventh embodiment is modified such that the extended rigid conduit connecting the vacuum head cavity to the vacuum conduit of the yard vacuum apparatus has a length of 20 inches. The conduit has a diameter of between 3 to 6 inches where the diameter is chosen to removably join and sealably engage with the diameter of the debris vacuum conduit of the yard vacuum. The elongated vacuum head has a length of 8 inches and a diameter of 4 inches.

The primary material employed in various embodiments of the vacuum attachment of this inventive disclosure is preferably a hard plastic such as acrylonitrile-butadiene-styrene (ABS), a variety of polycarbonates, or the use of poly-vinyl chloride (PVC) plastic. Many parts which were once metal are now made of much lighter and often stronger plastics. While reducing the production costs considerably, this change over has also made vacuum cleaners much lighter and easier to use. Embodiments are not limited to the use of plastic materials, however, and can be realized in aluminum, steel or brass as examples.

It is an objective of the inventive disclosure made herein to provide a yard vacuum attachment that adapts the yard vacuum for cleanup uses beyond the original intended use of the vacuum by enabling efficient debris cleanup in a variety of additional environments beyond the capabilities of the standard yard vacuum, such as but not limited to bleachers, theaters, athletic stadiums, baseball fields, football fields, school buildings, churches, convention halls, amusement park facilities, sawdust and debris in building construction, and factories, among other uses.

It is another objective of the inventive disclosure made herein to provide a yard vacuum attachment having a debris pick up opening having a wider cleaning swath than yard vacuum pick up attachments and therefore cleaning a given area in less time and with less effort.

It is another objective of the inventive disclosure made herein to provide a yard vacuum attachment that includes a stiff bristle brush in a facing relationship to the surface being cleaned, wherein the brush is used to loosen debris for vacuum pickup.

It is another objective of the inventive disclosure made herein to provide a yard vacuum attachment head having an adjustable head width, the head width suited to adjustment for cleaning between seat of a stadium or theater, the width adjustable to accommodate the width of the space to be cleaned.

It is another objective of the inventive disclosure made herein to provide a yard vacuum attachment having a debris pick up opening having a substantially forward facing alignment particularly suited to pickup of stadiums, bleachers and athletic field debris such as candy wrappers, chip bags and the like, while sweeping pop cans and bottles to the end of the stadium row for pickup at the end of the row.

It is another objective of the inventive disclosure made herein to provide a yard vacuum attachment that has been shown through use to allow two people to clean up stadium bleachers in 30 minutes time, a job that previously required four people for four hours before the invention of the vacuum attachment of the subject inventive disclosure.

It is another objective to provide a vacuum attachment for a yard vacuum that cleans various types of surfaces both inside and out. It is difficult to maneuver brooms and dust mops around and through bleachers and rough surfaces, and so a yard vacuum apparatus vacuum attachment that has a width adapted to clean between bleachers and stadium seats, that eases the cleaning of rough surfaces, an attachment that works like a vacuum cleaner but is used on surfaces other than carpets, such a yard vacuum attachment would be useful and beneficial.

These and other objects of the invention made herein will become readily apparent upon further review of the following specification and associated drawings.

BRIEF DESCRIPTION OF THE DRAWINGS

The drawings show a form of the invention that is presently preferred; however, the invention is not limited to the precise arrangement shown in the drawings.

DETAILED DESCRIPTION OF THE DRAWINGS

In preparation for explaining the details of the present inventive disclosure, it is to be understood by the reader that the invention is not limited to the presented details of the construction, materials and embodiments as illustrated in the accompanying drawings, as the invention concepts are clearly capable of other embodiments and of being practiced and realized in various ways by applying the disclosure presented herein.

Figure 1:
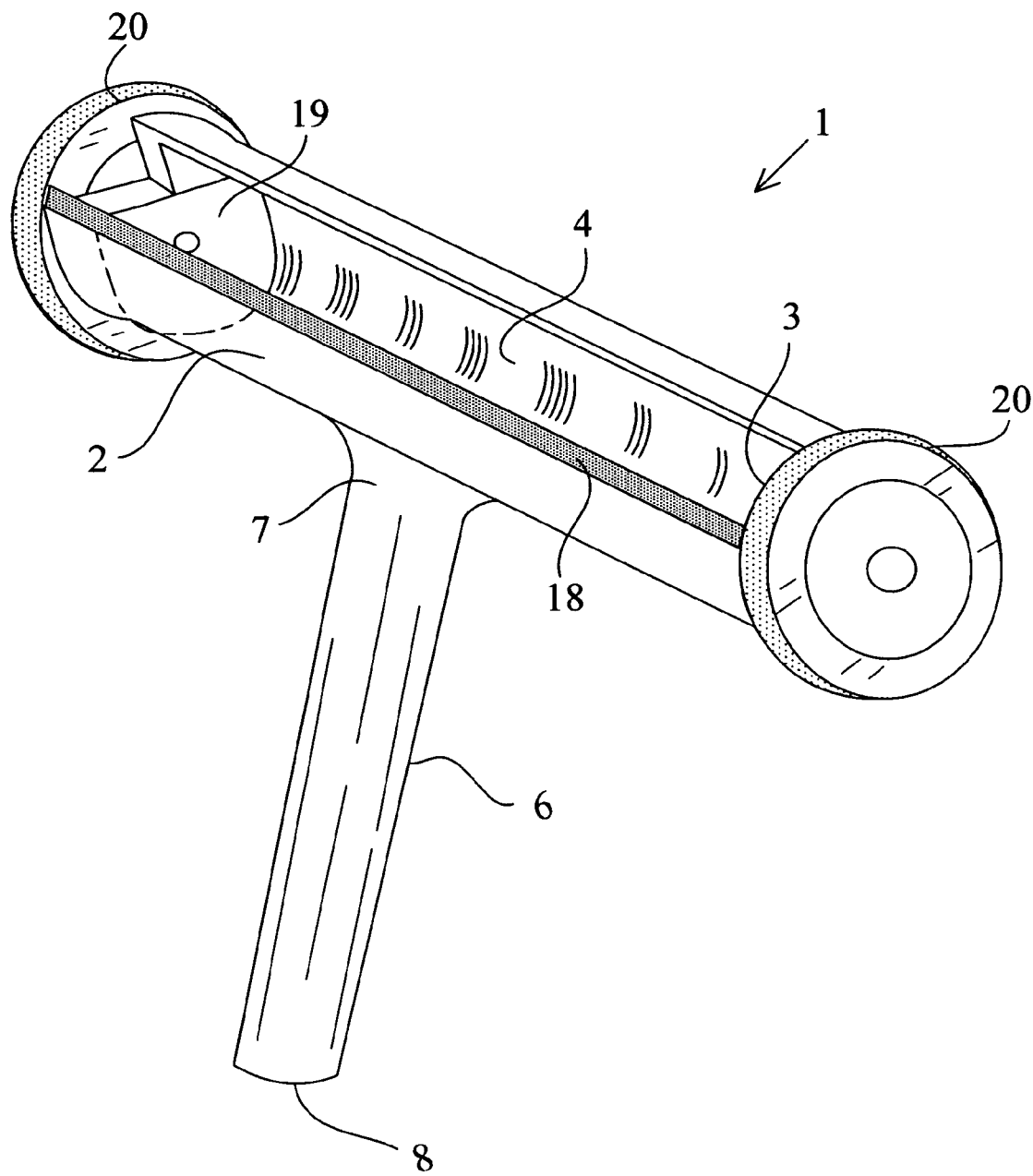
FIG. 1 presents a perspective view rotated to show details of the bottom of one embodiment of a vacuum attachment for a portable outdoor yard vacuum apparatus in accordance with the inventive disclosures herein.

FIG. 1 depicts a perspective view rotated to show details of the bottom of one embodiment of a vacuum attachment for a portable outdoor yard vacuum apparatus in accordance with the inventive disclosures herein. The vacuum attachment 1 includes an elongated vacuum head 2. The vacuum head 2 has an elongated slot 4 in the bottom of the vacuum head through which dirt and debris can be induced to enter the debris cavity 3 while vacuuming. A tubular conduit 6 having a lower end 7 and an upper end 8 and closed ends 19. The opening of the tubular conduit 6 being in fluid communication with the debris cavity 3. The upper end of the tubular conduit 8 sized and configured to removably and sealably connect to a vacuum connection of the outdoor yard vacuum apparatus so that debris that area gathered through the elongated slot 4 are received in the debris cavity 3 and transported by the vacuum induced air flow along the tubular conduit 6 into the yard vacuum apparatus connected to the upper end 8 of the tubular conduit. The yard vacuum apparatus is not shown. Two vacuum head carrier wheels 20, one wheel axially mounted to each closed end of the vacuum head such that the wheel is free to rotate and such that the wheel supports the vacuum head above the floor to be cleaned. A ¼ inch stiff bristle brush 18 is secured to bottom surface of the vacuum head such that the brush bristles align to brush the surface being cleaned. The wheels are sized to support the vacuum head at a distance of ⅜ inch above the surface to be cleaned.

Figure 2:
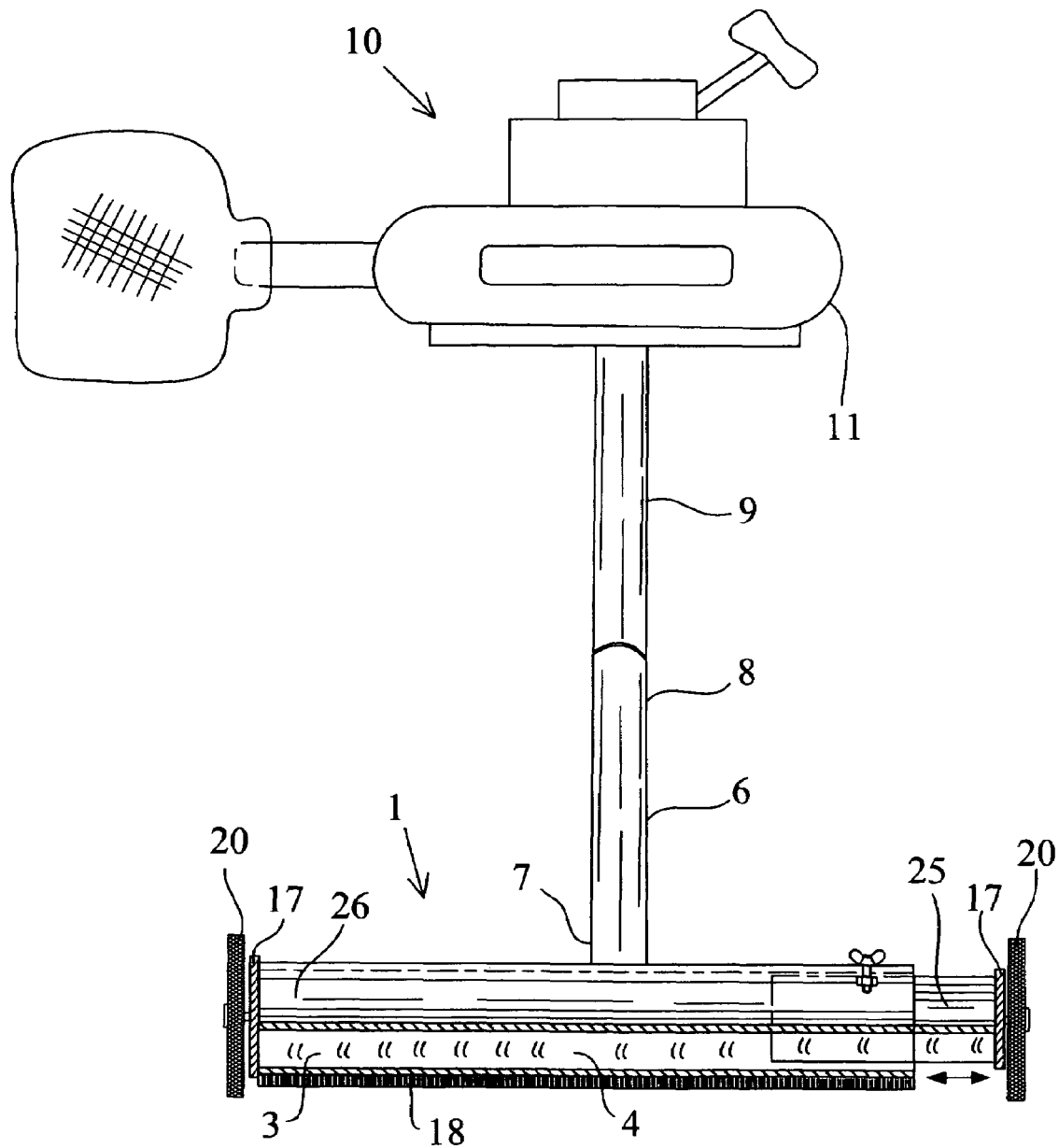
FIG. 2 presents a perspective view of the vacuum attachment of FIG. 1 connected to a portable yard vacuum apparatus in accordance with the inventive disclosures herein.

FIG. 2 presents a perspective view of another embodiment of the the vacuum attachment in accordance with the inventive disclosures herein. The vacuum attachment is connected to a portable yard vacuum Vacuum attachment 1 includes an extended tubular conduit 6. The extended tubular conduit 6 has a lower end 7 secured to the elongated vacuum head, the head comprising an inner tubular vacuum head and an outer tubular vacuum head, wherein the inner head 25 is retentively and telescopically received within the outer tubular vacuum head 26 such that the inner head is telescopically adjustable relative to the outer tubular head so that width of the vacuum head and debris slot 3 is adjustable to the desired width. A threaded bolt 27 is secured to and extending from an inside surface of the inner vacuum head 25 through to an elongated vacuum head length adjustment slot in the outer vacuum head 26, the slot sized to permit the inner head and the bolt to slide in the head length adjustment slot thereby adjusting inner and outer head position between collapsing the inner head into the outer head at one limit to extending beyond the outer head by 0 to 4 inches at opposite limit of travel. A threaded wing nut 28 is threadably received onto the bolt, the wing nut and bolt compressing sidewalls of the inner and outer head so as to fix the telescopic position of the inner and outer tubular vacuum heads. An extended rigid tubular conduit 6, the conduit having a diameter of between 3 to 6 inches, the diameter chosen to removably join with and sealably close on the diameter of the debris vacuum conduit 9 of the yard vacuum, wherein the debris receiving slot 4 of the vacuum head is in substantial axial alignment with axis of elongation of the tubular conduit 6, such that debris slot faces forward rather than in a conventional vacuum attachment. Two vacuum head carrier wheels 20 are shown, each wheel positioned beside the opposing end caps 17 of the vacuum head and axially mounted to the end caps such that the wheel 20 is free to rotate and such that the wheel supports the vacuum head above the floor to be cleaned. A ¼ inch stiff bristle brush 18 is secured to the bottom surface of the outer vacuum head such that the brush bristles align to brush the surface being cleaned, wherein the wheels are sized to support the vacuum head at a distance of ⅜ inch above the surface to be cleaned.

The center void of the tubular conduit is in fluid and pressure communication with the debris cavity 3 of the vacuum head. The upper end 8 of the extended tubular conduit is removably and sealably attached to the vacuum conduit 9 or blower suction inlet of the portable yard vacuum apparatus 10. Using air flow induced by blower 11, debris is induced into the vacuum head 2 through the elongated slot on the bottom of the head and into the debris cavity 3. Debris is carried by air flow through the debris exit hole 14 and into the extended tubular conduit 6 and onwards up into the portable yard vacuum 10. The debris pick up vacuum is induced by the operation of blower 11 which transports air and debris into debris accumulation bag 12.

Figure 3:
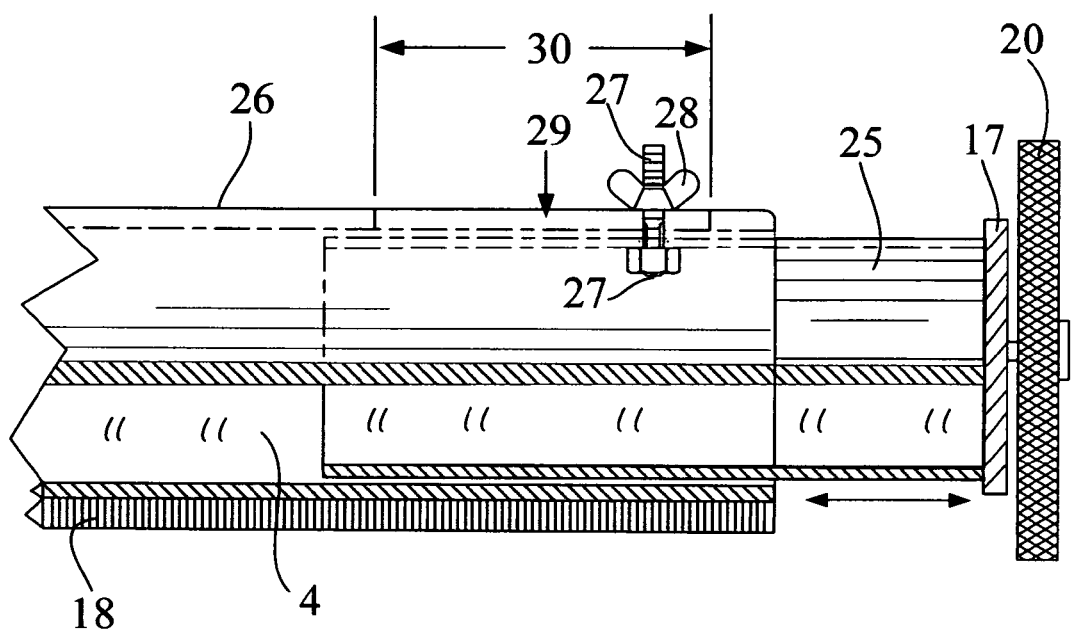
FIG. 3 presents a close up view of the inner and outer tubular vacuum heads of FIG. 2 together with the wing nut and slot head length adjustment means in accordance with the inventive disclosures herein.

FIG. 3 depicts a close up view of the inner and outer tubular vacuum heads of FIG. 2 together with the wing nut and slot head length adjustment means in accordance with the inventive disclosures herein. The tubular vacuum head comprises an inner tubular vacuum head 25 and an outer tubular vacuum head 26, wherein the inner head is retentively and telescopically received within the outer tubular vacuum head and the inner head is telescopically adjustable relative to the outer tubular head so that width of the vacuum head and width of the debris slot 4 is adjustable. A threaded bolt 27 is secured to and extending from an inside surface of the inner vacuum head through an elongated vacuum head length adjustment slot 29 in the outer vacuum head 26, the slot has a length 30 sized to permit the inner head 25 and the bolt 27 affixed thereto to slide in the slot 29 adjusting inner and outer head position between collapsing the inner head into the outer head at one limit to extending beyond the outer head by 0 to 4 inches at opposite limit of travel. A threaded wing nut 28 is threadably received onto the bolt 27, the wing nut 28 and bolt compressing sidewalls of the inner and outer head so as to fix the telescopic position of the inner and outer tubular vacuum heads. The vacuum head carrier wheel 20 is positioned beside the end cap 17 of the vacuum head and axially mounted to the end cap 17 by an axle such that the wheel is free to rotate and such that the wheel supports the vacuum head above the floor to be cleaned. A ¼ inch stiff bristle brush 18 is secured to bottom surface of the outer vacuum head such that the brush bristles align to brush the surface being cleaned. The wheels are sized to support the vacuum head at a distance of ⅜ inch above the surface to be cleaned.

FIG. 3 depicts another embodiment of a vacuum attachment for a yard vacuum apparatus in accordance with the inventive disclosures herein. The vacuum attachment 1 has a basic 'T' shape. The elongated vacuum head 2 is formed from pipe sections including a 'T' pipe section 15, and two lengths of pipe 16 which are closed at distant ends by end caps 17. End caps 17 include a side slot 5 which is positioned near the floor surface being cleaned and serves to limit the developed vacuum pressure so that the vacuum attachment may be moved easily across a surface during cleaning without binding tightly to the floor. The extended tubular conduit 6 is an elongated tubular pipe section and is secured to the vacuum head 2 at the 'T' pipe section 15. The upper end 8 of the extended tubular conduit is sized and fitted for removably and sealably attaching to a portable yard vacuum apparatus.

Figure 4:
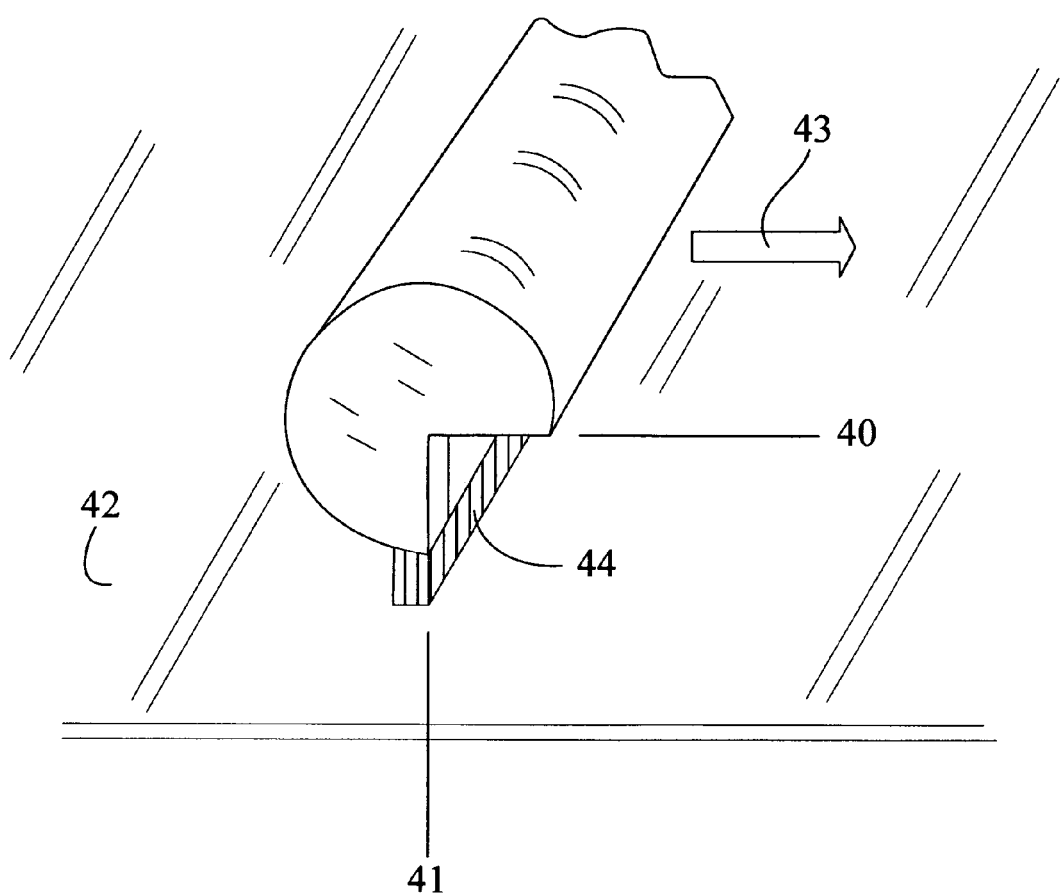
FIG. 4 presents a partial view of the tubular vacuum head, the view solely to illustrate the orientation of the debris slot and brush when the vacuum head is in use to pickup debris.

FIG. 4 depicts an intentionally incomplete view of the tubular vacuum head, the depicted components chosen solely to illustrate the orientation of the debris slot and brush when the vacuum head is in use to pickup debris. Many other essential components of the invention are not depicted in this view, for example the wheels and the tubular conduit. These components and others are depicted in FIG. 1 through FIG. 3 discussed above. Now discussing FIG. 4—In FIG. 4 the vacuum head debris slot is oriented with the debris slot opening between the 3 o'clock position 40 and the 6 o'clock position 41 when the vacuum head is positioned for use on the surface 42 to be cleaned of debris. The vacuum head, as illustrated, is moving forward according to direction arrow 43 to pickup debris from the surface 42. This orientation is preferred for all embodiments of the inventive disclosures herein.

In a preferred embodiment, the vacuum attachment for a yard vacuum apparatus has a vacuum head length along the surface to be cleaned of about 18 inches (with the inner vacuum head collapsed into the outer vacuum head), and a vacuum head and tubular conduit diameter of about 4 inches. The 18 inch length has been found through prototype testing to be ideal to fit perfectly between bleacher and stadium seats, eliminating the need to maneuver mops and brooms through tight areas. The adjustment provided between the inner and outer vacuum heads allowing the vacuum head length to be lengthened when the isle to be cleaned requires a wider swath.

The discussed construction, illustrations and sequence of operation is for one embodiment of the invention, but is in no way limiting to other embodiments. The operating modes may be changed and enhanced without deviating from the intention of this inventive disclosure.

In the preceding detailed description, reference has been made to the accompanying drawings that form a part hereof, and in which are shown by way of illustration specific embodiments in which the invention may be practiced. These embodiments and certain variants thereof have been described in sufficient detail to enable those skilled in the art to practice the invention. It is to be understood that other suitable embodiments may be utilized and that logical, material, and mechanical changes may be made without departing from the spirit or scope of the invention. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A vacuum attachment for a portable outdoor yard vacuum apparatus, the attachment comprising:

an elongated vacuum head having a debris cavity, an elongated debris receiving slot on a forward facing side of the head, the debris slot for receiving debris into the head cavity while vacuuming, wherein the debris slot is oriented to open between 3 o'clock and 6 o'clock position; wherein the vacuum head is an extended tubular vacuum head having two opposing ends, the debris receiving slot disposed along a length of the vacuum head, the vacuum head having two end caps, the end caps secured to the opposing ends of the tubular vacuum head; and wherein the conduit means is an extended tubular conduit having a lower end joined to and in fluid communication with the debris cavity of the vacuum head, and having an upper end sized and adapted to be removably joined to the vacuum conduit of the yard vacuum; wherein the vacuum head comprises an inner tubular vacuum head and an outer tubular vacuum head, wherein the inner head is retentively and telescopically received within the outer tubular vacuum head, wherein the inner head is telescopically adjustable relative to the outer tubular head so that width of the vacuum head and debris slot is adjustable; and wherein the vacuum head further comprises:

a threaded bolt secured to and extending from an inside surface of the inner vacuum head through an elongated vacuum head length adjustment slot in the outer vacuum head, the slot sized to permit the inner head and the bolt to slide in the slot adjusting inner and outer head position between collapsing the inner head into the outer head at one limit to extending beyond the outer head by 4 inches at opposite limit of travel;

a threaded wing nut sized and configured to be threadably received onto the bolt, the wing nut and bolt compressing sidewalls of the inner and outer head so as to fix the telescopic position of the inner and outer vacuum heads; and a ¼ inch stiff bristle brush secured to the bottom surface of the outer vacuum head such that the brush bristles align to brush the surface being cleaned, the brush positioned to be at the 6 o'clock position during use of the vacuum attachment, wherein the wheels are sized to support the vacuum head at a distance of ⅜ inch above the surface to be cleaned;

two vacuum head carrier wheels, each wheel positioned beside the vacuum head end cap and axially mounted to the end cap such that the wheel is free to rotate and such that the wheel supports the vacuum head above the floor to be cleaned; and a conduit means of removably joining said head to the vacuum conduit of the outdoor vacuum, said conduit providing closed transport of debris from the head cavity to a vacuum conduit and ultimately to the fan suction of the yard vacuum, wherein the vacuum attachment adapts said vacuum for cleanup uses beyond the original intended use of the vacuum, wherein the debris receiving slot is in substantial axial alignment with axis of elongation of said conduit means.

2. The vacuum attachment of claim 1 further comprising a stiff elongated debris brush secured to a bottom wall of the vacuum head behind the elongated debris slot, the brush positioned to brush the floor surface so as to loosen debris for vacuum pick up, the brush positioned to be at the 6 o'clock position during use of the vacuum attachment.

3. The vacuum attachment of claim 1, wherein the vacuum head is an elongated 'U' shaped vacuum head having tow opposing closed ends, wherein the debris receiving slot is the opening in the elongated 'U'.

4. The vacuum attachment of claim 3, wherein the conduit is in an extended tubular conduit having an upper end and a lower end, the lower end secured to the tubular vacuum head, the upper head sized and adapted for removably joining the vacuum conduit of the yard vacuum apparatus.

5. The vacuum attachment of claim 4, wherein the vacuum head further comprises:

two vacuum head carrier wheels, each wheel positioned beside the opposing closed ends of the vacuum head and axially mounted to the closed ends such that the wheel is free to rotate and such that the wheel supports the vacuum head above the floor to be cleaned.

6. The vacuum attachment of claim 3, wherein the conduit is a flexible hose having an upper end and a lower end, the lower end secured to the tubular vacuum head, the upper head sized and adapted for removably joining the vacuum conduit of the yard vacuum apparatus.

* * * * *